(12) United States Patent
Morioka

(10) Patent No.: US 9,544,859 B2
(45) Date of Patent: Jan. 10, 2017

(54) METHOD AND APPARATUS FOR REFERENCE SYMBOL TRANSMISSION

(71) Applicant: SONY CORPORATION, Tokyo (JP)

(72) Inventor: Yuichi Morioka, Reading (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/650,703

(22) PCT Filed: Jan. 17, 2014

(86) PCT No.: PCT/GB2014/050144
§ 371 (c)(1),
(2) Date: Jun. 9, 2015

(87) PCT Pub. No.: WO2014/118506
PCT Pub. Date: Aug. 7, 2014

(65) Prior Publication Data
US 2015/0327185 A1    Nov. 12, 2015

(30) Foreign Application Priority Data
Jan. 31, 2013    (GB) .................................. 1301728.0

(51) Int. Cl.
| | | |
|---|---|---|
| *H04J 3/00* | (2006.01) | |
| *H04W 52/32* | (2009.01) | |
| *H04W 52/14* | (2009.01) | |
| *H04L 5/00* | (2006.01) | |

(52) U.S. Cl.
CPC ............ *H04W 52/32* (2013.01); *H04L 5/0048* (2013.01); *H04W 52/143* (2013.01); *H04L 5/0044* (2013.01)

(58) Field of Classification Search
CPC ............................................... H04W 72/0446

USPC ......................................................... 370/336
See application file for complete search history.

(56) References Cited

U.S. PATENT DOCUMENTS

| | | |
|---|---|---|
| 2010/0027512 A1 | 2/2010 | Kishiyama et al. |
| 2010/0220651 A1 | 9/2010 | Chen et al. |
| 2014/0010183 A1 | 1/2014 | Mcnamara et al. |

FOREIGN PATENT DOCUMENTS

| | | |
|---|---|---|
| EP | 2 104 255 A1 | 9/2009 |
| EP | 2 515 448 A1 | 10/2012 |
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |

(Continued)

OTHER PUBLICATIONS

U.S. Appl. No. 14/651,421, filed Jun. 11, 2015, Morioka.

(Continued)

*Primary Examiner* — Samina Choudhry
(74) *Attorney, Agent, or Firm* — Oblon, McClelland, Maier & Neustadt, L.L.P.

(57) ABSTRACT

To facilitate a selective transmission power boost in a narrowband subsystem of a wideband host carrier, wherein the narrowband subsystem is preferentially allocated to reduced capability communications devices, both data symbols and dedicated reference symbols are transmitted at a higher power within the narrowband. Where the benefits of inserting dedicated reference symbols are outweighed by the loss of data capacity, no dedicated reference symbols are inserted.

16 Claims, 11 Drawing Sheets

(56) References Cited

FOREIGN PATENT DOCUMENTS

| GB | 2488513 A | 9/2012 |
|---|---|---|
| WO | WO 2011/062066 A1 | 5/2011 |
| WO | WO 2011/085192 A1 | 7/2011 |
| WO | WO 2012/064779 A1 | 5/2012 |
| WO | WO 2012/104635 A1 | 8/2012 |

OTHER PUBLICATIONS

United Kingdom Search Report issued Jul. 23, 2013 in Patent Application No. GB1301728.0.
International Search Report issued Apr. 10, 2014 in PCT/GB2014/050144.
"Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10)" ETSI TS 122 368 V10.5.0, Jul. 2011, 18 Pages.

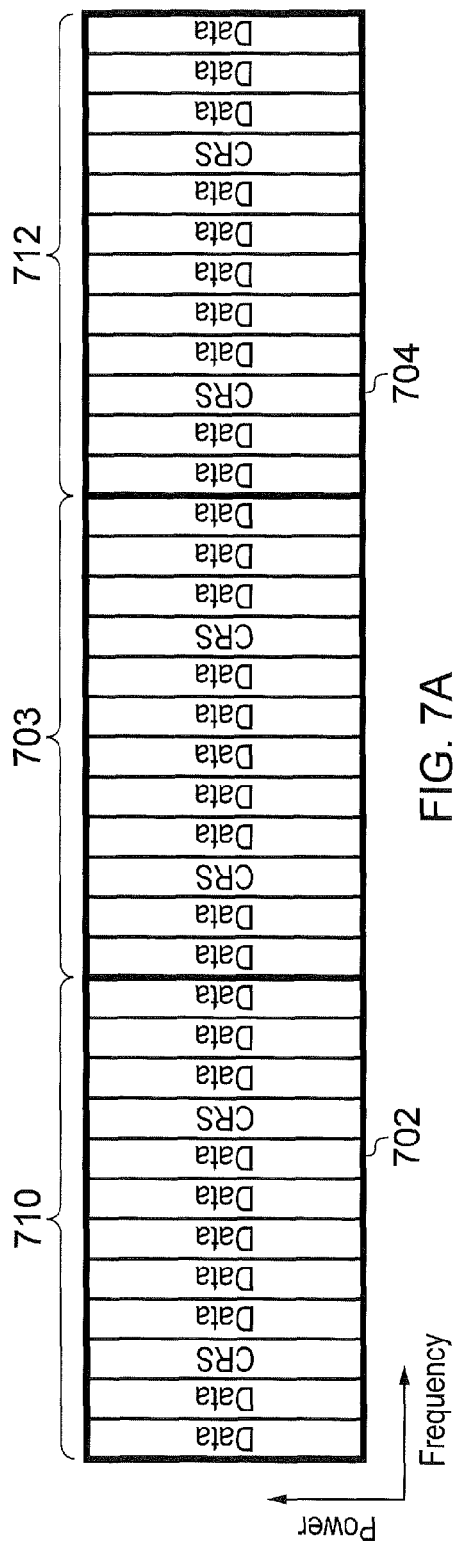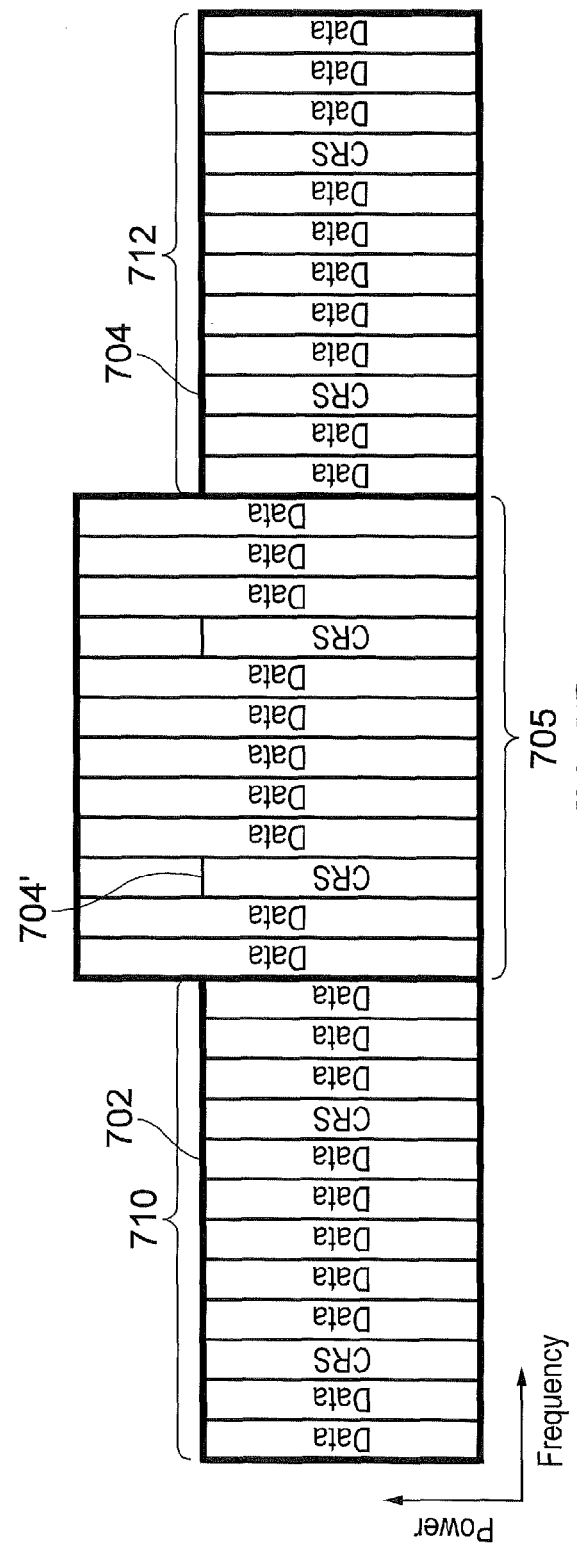

METHOD AND APPARATUS FOR REFERENCE SYMBOL TRANSMISSION

CROSS-REFERENCE TO RELATED APPLICATIONS

The present application is based on PCT/GB2014/050144 filed Jan. 17, 2014 and claims priority to British Patent Application 1301728.0, filed in the UK IPO on 31 Jan. 2013, the entire contents of each of which being incorporated herein by reference.

BACKGROUND OF THE INVENTION

The present invention relates to telecommunications apparatus, methods, systems and apparatus for transmitting data to and/or receiving data from mobile terminals in a wireless communications system. Example embodiments of the present technique can provide a facility for varying the level of power in selected transmissions.

There is an approximate relationship between coverage within a wireless communications system and the power with which signals are transmitted from infrastructure equipment such as base stations (e.g. eNodeBs) and/or network controllers (e.g. RNCs, eNodeBs) to user equipment (UE— i.e. wireless communications devices).

A distance between infrastructure equipment and user equipment (UE) is the main factor in determining the power in signals received from the infrastructure equipment at the UE. The further apart the UE and infrastructure equipment lie, the greater the attenuation a signal will experience until the point when the attenuated signal has a power level of the same order as the ambient noise.

A location of a UE can also determine whether the transmission power is adequate. UEs positioned indoors or underground experience significant attenuation: being within a predetermined radial distance of infrastructure equipment may be a necessary condition but is not a sufficient one.

An anticipated widespread deployment of third and fourth generation cellular networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Unlike a conventional third or fourth generation terminal device such as a smartphone, an MTC-type terminal is preferably relatively simple and inexpensive: in addition MTC-devices are often deployed in situations that do not afford easy access for direct maintenance or replacement— reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a subframe. Accordingly, data transmitted on the virtual carrier can be received and decoded using a reduced complexity receiver unit.

As noted above, the nature of MTC devices can lead to their deployment in locations where radial distance to the infrastructure equipment is not the only significant factor in attenuation of signals. To improve coverage for such devices, it would be desirable to provide signalling at a higher transmission power. Coverage can then be extended by ensuring that data is transmitted at a sufficiently high power that the MTC device can receive the signal.

To permit channel estimation LTE however relies upon the transmission power of certain symbols, known as reference or pilot symbols. Channel estimation refers to the facility for measuring channel characteristics (such as the complex gain) at certain, predetermined, positions in a radio frame (i.e. times and/or frequencies) so that the approximate channel characteristics at all positions in the frame can be deduced. Channel estimates are in turn used to equalize the effects of noise on all channels.

As the transmission power of the reference signals is one of the channel characteristics measured in channel estimation, these reference signals cannot be transmitted at different powers without disrupting the channel estimation and subsequent equalization functions. For those UEs where greater attenuation is experienced (such as MTC devices installed in cellars), this leads to a situation where the reference symbols are attenuated to such an extent they are inadequate for channel estimation.

SUMMARY OF THE INVENTION

According to a first aspect of the invention there is provided a method for communicating with a communications device from an infrastructure equipment forming part of a wireless communications network, the method comprising: transmitting data to communications devices via a wireless access interface, the wireless access interface providing a plurality of communications resource elements across a system bandwidth, which are divided in time into a plurality of time divided radio frames, providing, within the system bandwidth, a first section of communications resource elements within a first frequency bandwidth for allocation preferably to reduced capability communications devices to receive signals representing the data transmitted by the infrastructure equipment within the first frequency bandwidth forming a virtual carrier, the reduced capability communications devices each having a receiver bandwidth which is greater than or equal to the first frequency bandwidth but less than the system bandwidth, wherein transmitting data to the communications resources includes transmitting data symbols on a first subset of the resource elements in one or more of the radio frames, and transmitting common reference symbols on a second subset of the resource elements in each radio frame at a first transmission power; and wherein the data symbols in said virtual carrier are transmitted on the first subset of resource elements at a second transmission power; and the method further comprises determining a difference in transmission power between the second transmission power and the first transmission power, and if the difference in transmission power substantially exceeds a set threshold, generating specific reference symbols and inserting said specific reference symbols within the virtual carrier in place of one or more of the data symbols, said specific reference symbols having a third transmission power, the third transmission power being greater than the first transmission power.

The wireless communications network preferably (i.e. preferentially) allocates the communications resources to the reduced capability devices in the sense that the reduced capability devices are given priority to the communications resources of the first second section of communications resources over the allocation of the communications resources to communications devices which are able to communicate using the full bandwidth of the host carrier of the mobile communications network. In one example, the first section of the communications resources forming the first virtual carrier is reserved for allocation to the reduced capability devices only, but in other examples, some of the communications resources of the first section of the first virtual carrier may be allocated to the full capability communications devices, if a demand for the communications resources from the reduced capability devices leaves some of the communications resources un-allocated.

Various further aspects and embodiments of the invention are provided in the accompanying independent and dependent claims.

It will be appreciated that features and aspects of the invention described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF DRAWINGS

Embodiments of the present invention will now be described by way of example only with reference to the accompanying drawings, where like parts are provided with corresponding reference numerals and in which:

FIGS. 7A and 7B contrast the transmission powers of a plurality of subcarriers including subcarriers providing a narrow band virtual carrier with and without, respectively, power boosting of data symbols within the virtual carrier;

DETAILED DESCRIPTION

Figure 1A:
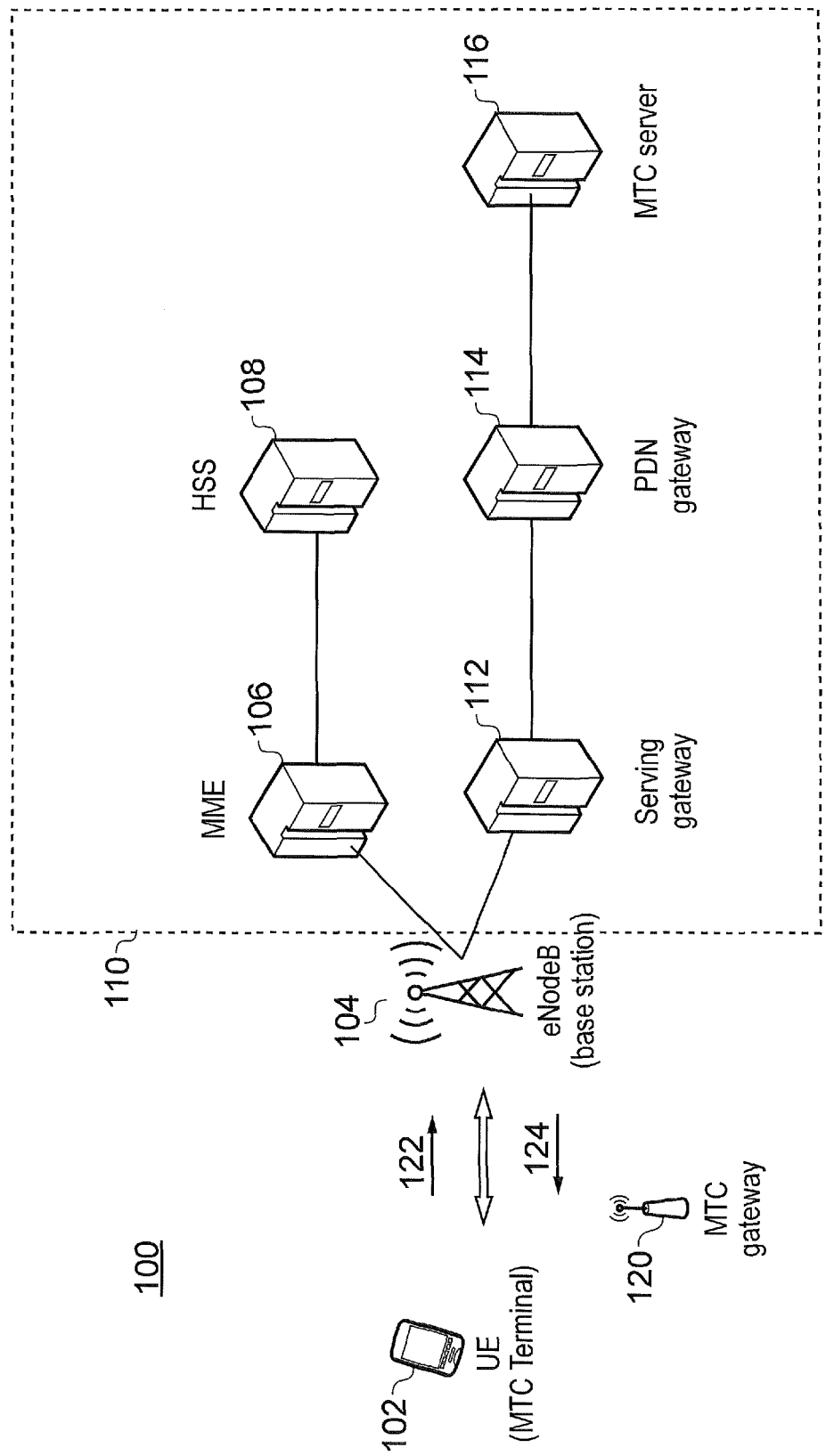
FIGS. 1A, 1B and 1C illustrate schematically certain functional elements of a conventional mobile telecommunications network.

FIG. 1A provides a schematic diagram illustrating some basic functionality of a conventional mobile telecommunications network, using for example Long Term Evolution (LTE) architecture.

The network includes a plurality of base stations 104 (only one is shown for simplicity) connected to a core network 110 (in dotted box). Each base station 104 provides a coverage area (i.e. a cell) within which data can be communicated to and from terminal devices (also referred to as mobile terminals, MT or User equipment, UE) 102. Data is transmitted from base stations 104 to terminal devices 102 within their respective coverage areas via a radio downlink 124. Data is transmitted from terminal devices 102 to the base stations 104 via a radio uplink 122.

The core network 110 routes data to and from the terminal devices 102 via the respective base stations 104 and provides functions such as authentication, mobility management, charging and so on. Typical entities in a core network include a Mobility Management Entity, MME, 106 and a subscriber database (HSS) 108: these entities facilitate the provision of communications services to UEs wherever they are located within the coverage of the network. Access to data services is provided by a serving gateway 112 and a packet data network, PDN, gateway 114.

FIG. 1A also shows elements which extend the network to allow efficient management of machine type communication (MTC) devices. The illustrated core network 110 incorporates an MTC server 116. An optional MTC gateway 120 is also shown in FIG. 1A: such a gateway may provide a hub terminal device which is in communication with one or more MTC devices and in turn establishes uplink and/or downlink communication paths with the base stations 104 on behalf of the connected MTC devices.

Figure 1B:
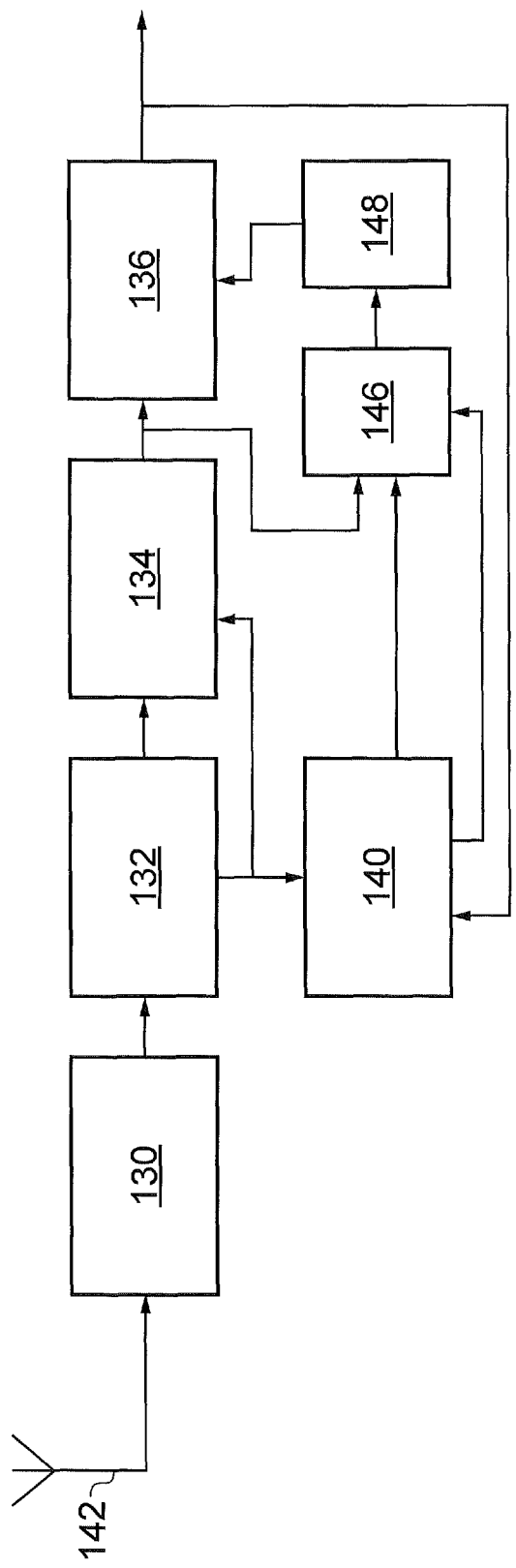

The UE 102 has certain functional blocks which provide a receive path, as illustrated in FIG. 1B. Signals in the radio downlink 124 are received at an antenna arrangement 142 and sent to a synchronisation and down-conversion block 132 via a radio frequency receiver unit 130. The radio frequency receiver unit 130 typically includes a Low Noise Amplifier (LNA), which amplifies the received signal from the antenna arrangement 142. The synchronisation and down-conversion block 132 converts RF signals to baseband (BB) signals. A variety of receiver architectures may be adopted to provide suitable down-conversion (for example direct conversion, super heterodyne etc.). The synchronisation and down-conversion block 132 also typically includes a local oscillator (LO), which re-generates a clock for demodulation, and an Analog to Digital converter (A/D) 1506, which converts analogue signals to digital signals for processing in baseband circuitry.

Baseband processing functions are controlled at a controller 140. Synchronised and down-converted digital signals are demodulated in a demodulator unit 134 (for example an inverse fast Fourier transform unit) and passed to an equaliser unit 136. The controller unit 140 takes as input the synchronised and down-converted digital signals as well as the equalised signals output by the equaliser unit 136. The controller controls a reference signal processing unit 146 instructing the identification of suitable reference signals and, if necessary, the generation of virtual reference signals, from the demodulated signals output by the demodulator unit 134. From the radio characteristics of the reference signals identified in the reference signal processing unit 146, a channel estimator unit 148 generates estimated characteristics for all channels in the received signals. The equalizer unit 136 then uses the channel estimates to generate equalised signals. The equalised signals are then passed to protocol circuitry for channel decoding.

Figure 1C:
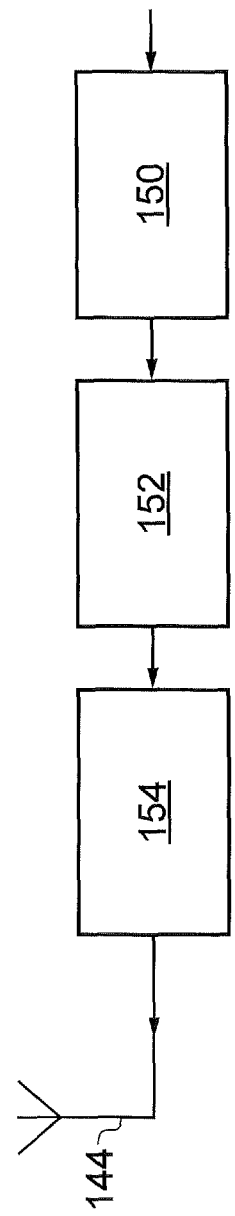

The infrastructure equipment, such as the base station 104, has certain functional blocks which are required in the preparation of a signal for downlink 124 transmission, as illustrated in FIG. 1C. In particular, the base station includes a radio antenna arrangement 144, which transmits radio signals Typically more than one antenna element is provided for diversity/MIMO transmission. A radio frequency block 154 provides the signal for transmission by the antenna arrangement 144. Typically it will include an amplifier which applies a gain to the signal for transmission and an RF transceiver which up converts from BB to RF, as required. Baseband circuitry which provides functionality such as channel coding/decoding, modulation/demodulation, channel estimation, equalization etc. includes a scheduler 152 for scheduling the downlink data for a UE based on measured or predetermined radio characteristics and a controller unit 150, which determines the operation of the scheduler 152.

In mobile telecommunications systems such as those arranged in accordance with the 3GPP defined Long Term Evolution (LTE) architecture, communication between base stations (e.g. eNodeB 104) and communications terminals (e.g. UE 102, MTC gateway 120) is conducted over a wireless air-interface, Uu. Downlink 124 on the Uu interface uses an orthogonal frequency division multiple access (OFDMA) technology, while uplink 122 uses single carrier frequency division multiple access (SC-FDMA) technology. In both cases, the system bandwidth is divided into a plurality of "subcarriers" (each occupying 15 kHz).

Figure 2:
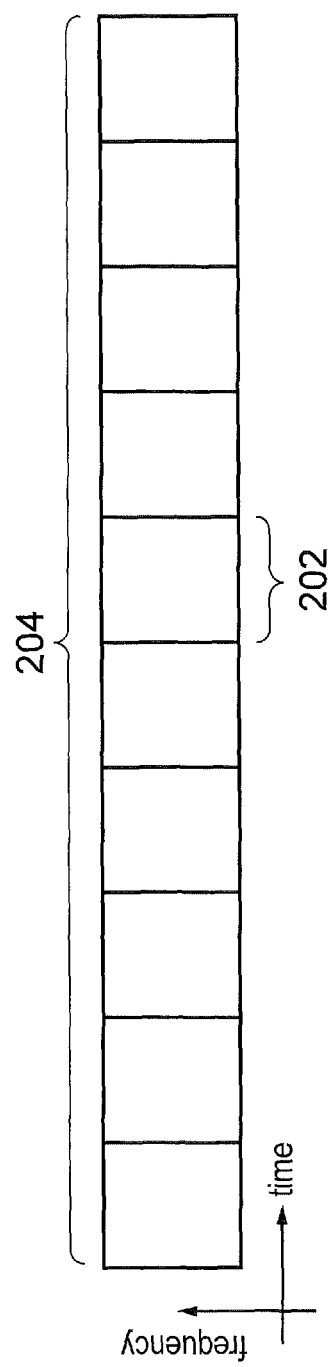
FIG. 2 provides a schematic diagram illustrating a conventional LTE radio frame.

The downlink Uu interface organises resources in time using a "frame" structure. A downlink radio frame is transmitted from an eNode B and lasts 10 ms. As shown in FIG. 2, the downlink radio frame 204 comprises ten subframes 202, each subframe lasting 1 ms. The subframe in turn comprises a predetermined number of "symbols", which are each transmitted over a respective $\frac{1}{14}$ ms period. Each symbol comprises a predetermined number of orthogonal subcarriers distributed across the bandwidth of the downlink radio carrier. Here, the horizontal axis represents time while the vertical represents frequency.

The smallest allocation of user data for transmission in LTE is a "resource block" comprising twelve sub-carriers transmitted over one slot (0.5 sub-frame). Each individual box in the sub-frame grid in FIG. 3 corresponds to twelve sub-carriers transmitted on one symbol.

Figure 3:
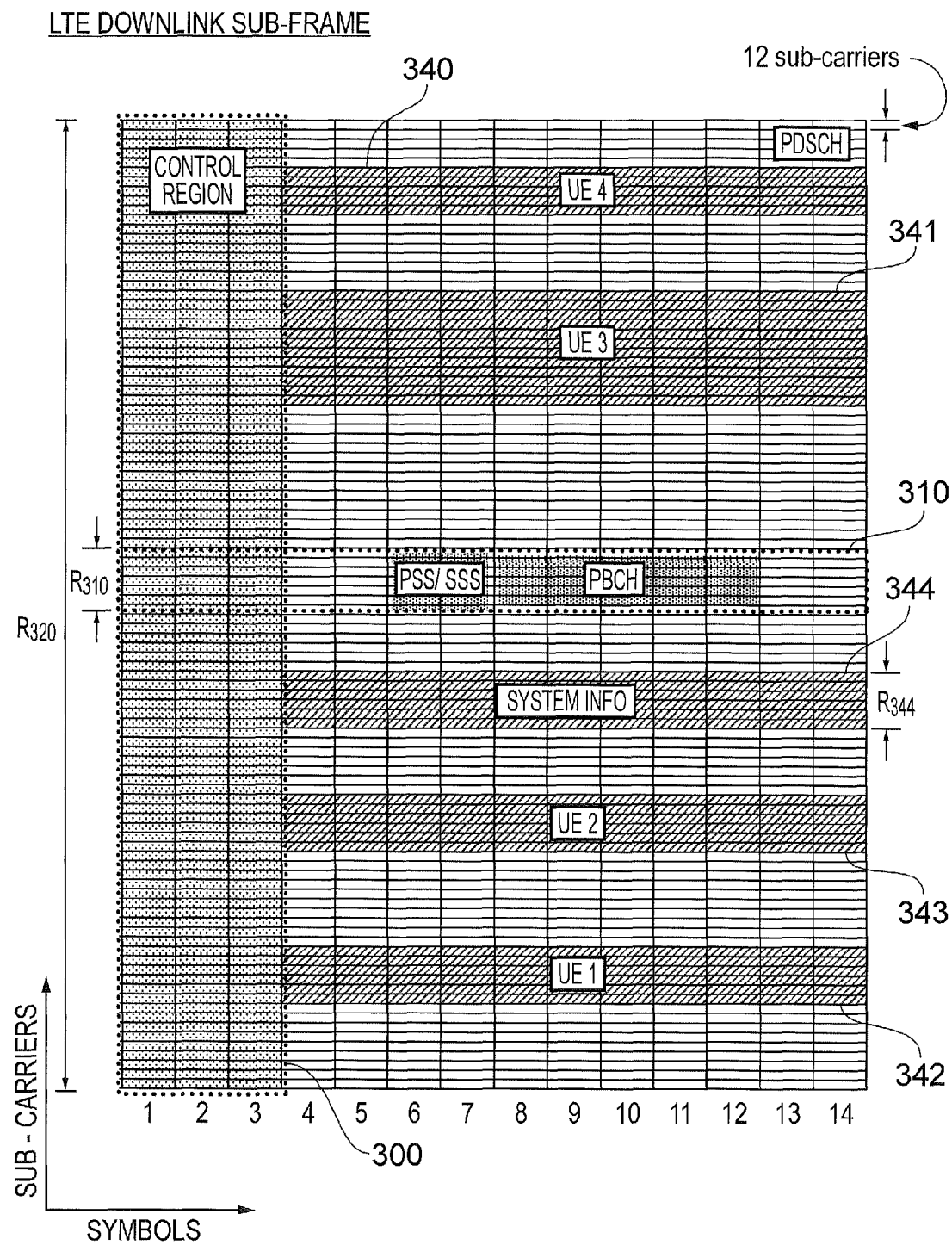
FIG. 3 provides a schematic diagram illustrating an example of a conventional LTE downlink radio sub-frame.

FIG. 3 shows, in hatching, resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of R344. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc.

Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive: in addition MTC-devices are often deployed in situations that do not afford easy access for direct maintenance or replacement—reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices.

In many scenarios, providing low capability terminals such as those with a conventional high-performance LTE receiver unit capable of receiving and processing (control) data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal.

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a sub-frame. Accordingly, data transmitted on the virtual carrier can be received and decoded using a reduced complexity receiver unit.

The term "virtual carrier" corresponds in essence to a narrowband carrier for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. For ease of reference, however, an overview of certain aspects of the concept of virtual carriers is set out in Annex 1.

Figure 4:
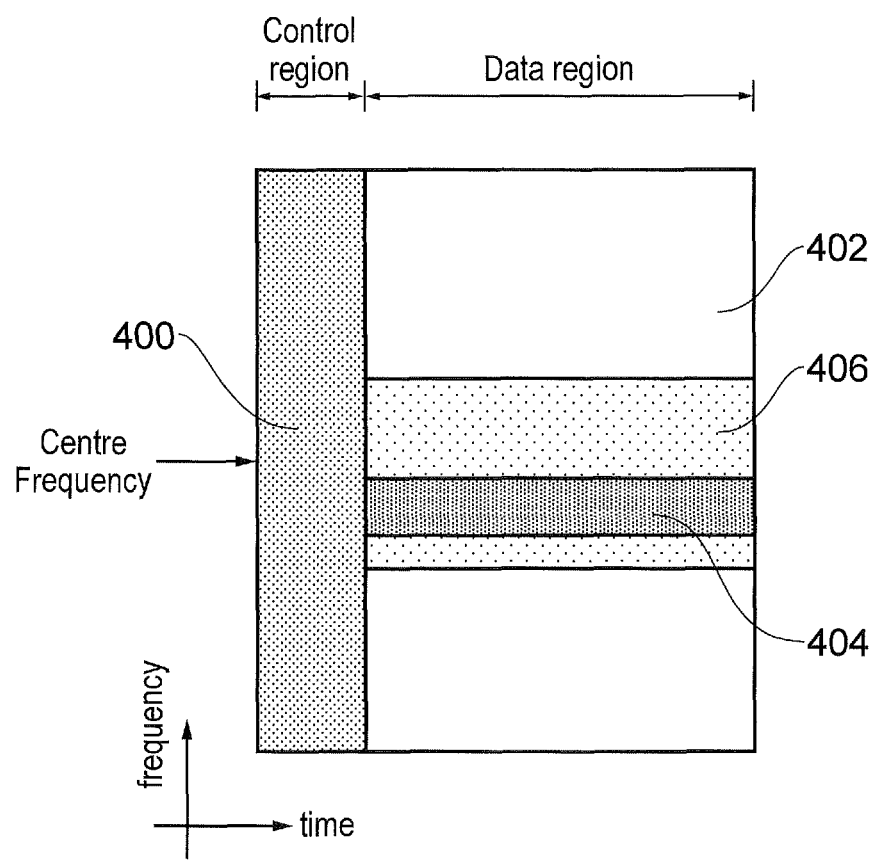
FIG. 4 provides a schematic diagram illustrating an example of a LTE downlink radio sub-frame in which a narrow band virtual carrier has been inserted.

FIG. 4 schematically represents an arbitrary downlink subframe according to the established LTE standards as discussed above into which an instance of a virtual carrier 406 has been introduced. The subframe is in essence a simplified version of what is represented in FIG. 3. Thus, the subframe comprises a control region 400 supporting the PCFICH, PHICH and PDCCH channels as discussed above and a PDSCH region 402 for communicating higher-layer data (for example user-plane data and non-physical layer control-plane signalling) to respective terminal devices, as well as system information, again as discussed above. For the sake of giving a concrete example, the frequency bandwidth (BW) of the carrier with which the subframe is associated is taken to be 20 MHz. Also schematically shown in FIG. 4 by black shading is an example PDSCH downlink allocation 404. In accordance with the defined standards, and as discussed above, individual terminal devices derive their specific downlink allocations 404 for a subframe from PDCCH transmitted in the control region 400 of the subframe.

By contrast with the conventional LTE arrangement, where a subset of the available PDSCH resources anywhere across the full PDSCH bandwidth could be allocated to a UE in any given subframe, in the T-shaped arrangement illustrated in FIG. 4, MTC devices may be allocated PDSCH resources only within a pre-established restricted frequency band 406 corresponding to a virtual carrier.

Accordingly, MTC devices each need only buffer and process a small fraction of the total PDSCH resources contained in the subframe to identify and extract their own data from that subframe.

The pre-established restricted frequency band used to communicate, e.g. on PDSCH in LTE, from a base station to a terminal device, is thus narrower than the overall system frequency band (carrier bandwidth) used for communicating physical-layer control information, e.g. on PDCCH in LTE. As a result, base stations may be configured to allocate downlink resources for the terminal device on PDSCH only within the restricted frequency band. As the terminal device knows in advance that it will only be allocated PDSCH resources within the restricted frequency band, the terminal device does not need to buffer and process any PDSCH resources from outside the pre-determined restricted frequency band.

In this example it is assumed the base station and the MTC device have both pre-established that data is to be communicated from the base station to the MTC device only within the restricted frequency band defined by upper and lower frequencies f1 and f2 (having a bandwidth $\Delta f$). In this example the restricted frequency band encompasses the central part of the overall system (carrier) frequency band BW. For the sake of a concrete example, the restricted frequency band is assumed here to have a bandwidth (Δt) of 1.4 MHz and to be centred on the overall system bandwidth (i.e. f1=fc−Δf/2 and f2=fc+Δf/2, where fc is the central frequency of the system frequency band). There are various mechanisms by which the frequency band can be established/shared between a base station and terminal device and some of these are discussed further below.

FIG. 4 represents in shading the portions of each subframe for which the MTC device is arranged to buffer resource elements ready for processing. The buffered part of each subframe comprises a control region 400 supporting conventional physical-layer control information, such as the PCFICH, PHICH and PDCCH channels as discussed above, and a restricted PDSCH region 406. The physical-layer control regions 400 that are buffered are in the same resources as the physical-layer control regions buffered by any conventional UE. However, the PDSCH regions 406 which are buffered by the MTC device are smaller than the PDSCH regions buffered by conventional UEs. This is possible because, as noted above, the MTC devices are allocated PDSCH resources only within a restricted frequency band that occupies a small fraction of the total PDSCH resources contained in the subframe.

Accordingly, the MTC device will in the first instance receive and buffer the entire control region 400 and the entire restricted frequency band 406 in a subframe. The MTC device will then process the control region 400 to decode PDCCH to determine what resources are allocated on PDSCH within the restricted frequency band, and then process the data buffered during PDSCH symbols within the restricted frequency band and extract the relevant higher-layer data therefrom.

In one example LTE-based implementation, each subframe is taken to comprise 14 symbols (timeslots) with PDCCH transmitted on the first three symbols and PDSCH transmitted on the remaining 11 symbols. Furthermore, the wireless telecommunications system is taken in this example to operate over a system frequency band of 20 MHz (100 resource blocks) with a pre-established restricted frequency band of 1.4 MHz (six resource blocks) defined for communicating with the terminal devices supporting virtual carrier operation.

As explained above, in OFDM-based mobile communication systems such as LTE, downlink data is dynamically assigned to be transmitted on different sub-carriers on a sub-frame by sub-frame basis. Accordingly, in every subframe, the network signals which sub-carriers on which symbols contain data relevant to which terminals (i.e. downlink allocation signalling).

As can be seen from FIG. 3, in a conventional downlink LTE sub-frame information regarding which symbols contain data relevant to which terminals is transmitted on the PDCCH during the first symbol or symbols of the sub-frame.

It has been proposed to allow the transmission power to be boosted in the virtual carrier to improve MTC coverage. This is a practical suggestion where a considerable proportion of the MTC devices can be assumed to be installed at locations with sub-optimal coverage.

Figure 5:
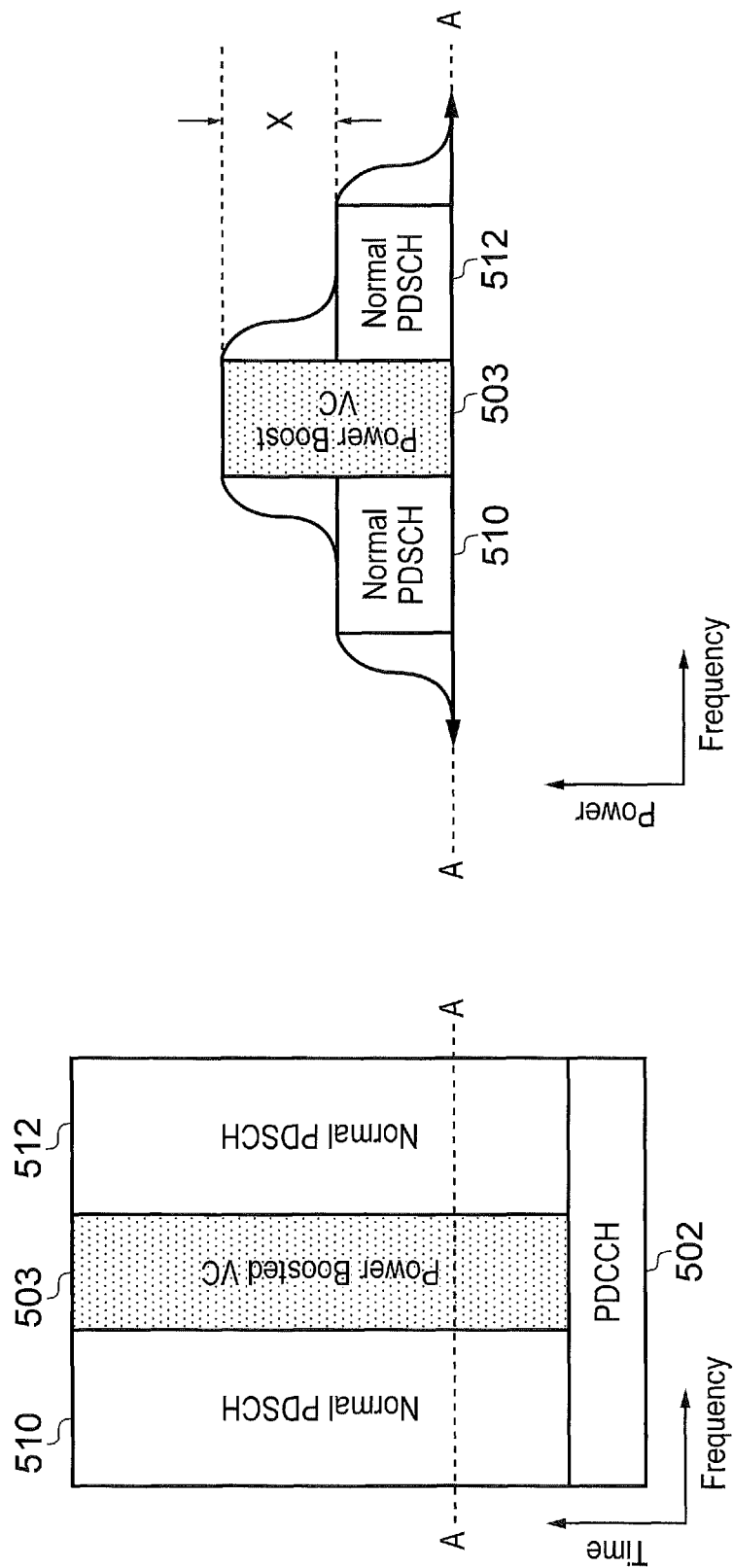
FIGS. 5A and 5B illustrate a subframe in which a narrow band virtual carrier has been inserted at a boosted transmission power.

FIG. 5A illustrates a subframe in similar to that in FIG. 4 in which a narrow band virtual carrier 503 has been inserted at a boosted transmission power. As in FIG. 4, the subframe comprises a control region 502 supporting the PCFICH, PHICH and PDCCH channels as discussed above and a PDSCH region 510,512 for communicating higher-layer data (for example user-plane data and non-physical layer control-plane signalling) to respective terminal devices.

FIG. 5B shows the relative transmission power in the "normal" PDSCH region 510,512 outside the virtual carrier at a given time, represented as the cut A-A in FIG. 5A. The difference in transmission power between the boosted virtual carrier 503 and the surrounding PDSCH region 510,512, X, allows coverage to be increased for MTC devices.

Figure 6:
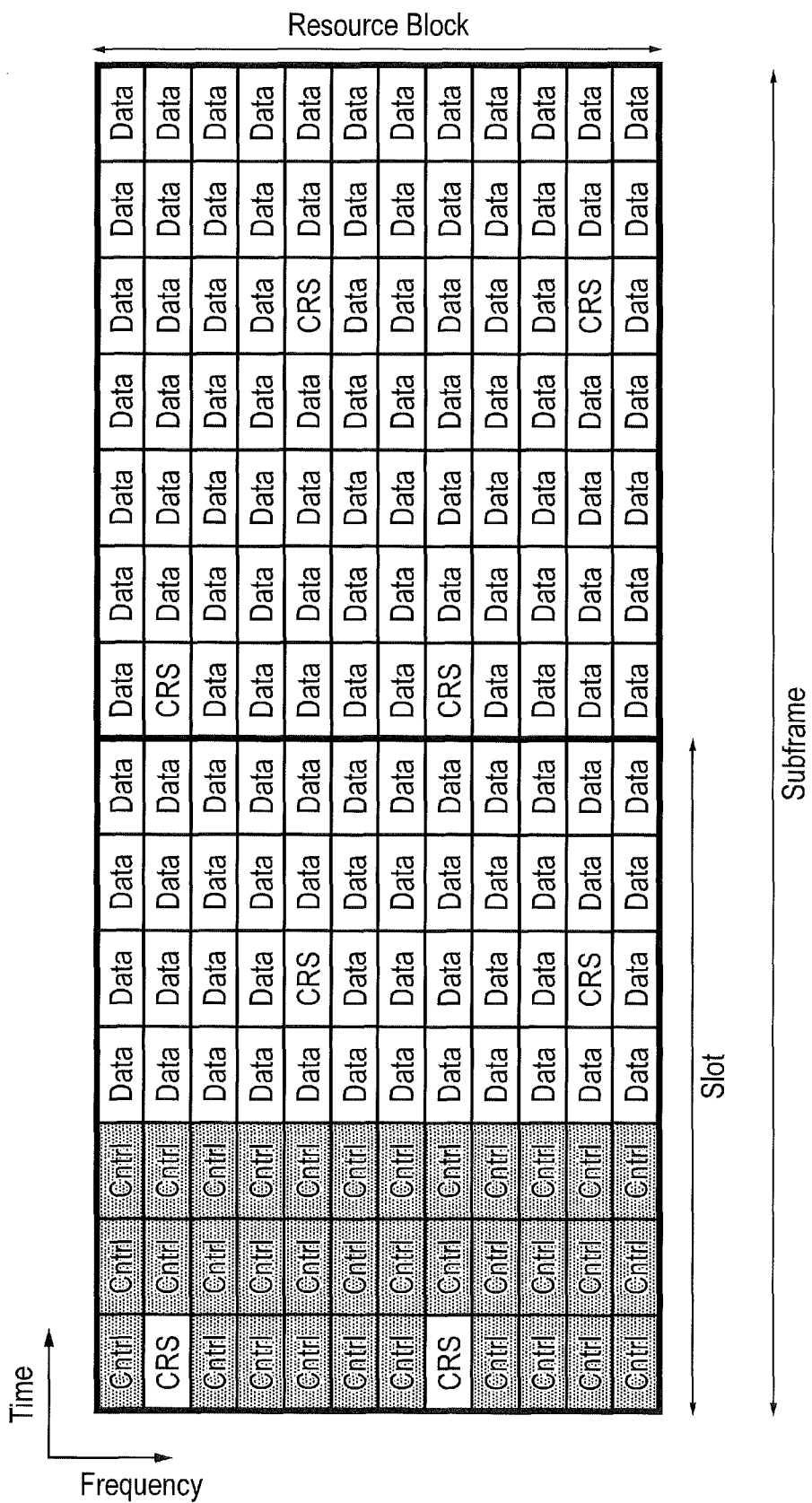
FIG. 6 provides a schematic diagram illustrating the resource elements in a pair of resource blocks in a downlink radio sub-frame.

FIG. 6 provides a schematic diagram illustrating the resource elements in a pair of resource blocks in a downlink radio sub-frame. As noted above, a sub-frame typically includes three subsets of resource elements; Data Elements (corresponding to PDSCH) which are the resource elements containing user data, Control Elements (corresponding to PDCCH, PHICH, and/or PFICH) containing control information, and Reference Elements (Common Reference Signal—CRS) which are used for channel estimation. Data elements are indicated as rectangles containing the word "Data"; Control elements, with the letters "Cntrl"; and Reference Elements with the letters "CRS". As can be seen, the common reference symbols are inserted at predetermined, periodic, positions in time and frequency within each resource block of the sub-frame.

The two resource blocks in FIG. 6 represent resource block in the virtual carrier bandwidth, however resource blocks in other regions of the sub-frame have similar constituent resource elements.

FIG. 7A illustrates a section through a subframe at a given time and shows the transmission power as the vertical axis and frequency as the horizontal axis. Normal PDSCH regions 710,712 surround a narrow band virtual carrier 703, which (for simplicity) occupies only 12 subcarriers, 1RB. The data resource elements 702 and reference signal resource elements 704 in PDSCH regions 710,712 and the virtual carrier region 703 are all shown at the same transmission power.

FIG. 7B illustrates a similar section where the data resource elements 706 in the virtual carrier region 705 are of higher transmission power than data resource elements 702 of the PDSCH regions 710,712. Common reference signals 704,704' remain at the same transmission power whether they fall within the PDSCH regions 710,712 or the virtual carrier region 705.

In the non-power boosted case illustrated in FIG. 7A, the resource elements carrying data and CRS are transmitted at substantially the same power.

In the power boosted case, FIG. 7B, only the data resource elements 706 can be power boosted. The CRS resource elements 704' in the virtual carrier region 705 cannot be power boosted because they will be received and used by other UEs (whether they are MTC devices or generic UEs with full receiver capabilities) within the cell to estimate the channel (hence the name "Common" Reference Signal), not just those that need the power boosted signal.

As noted above, acquiring the known common reference signal and conducting channel estimation is an important part of demodulation of the data signal. If the received power of the CRS is too low, the UE may not be able to correctly receive the data correctly, regardless of whether the data signals are power boosted (as they are in FIG. 7B).

The restriction on varying the transmission power of pilot or reference signals is known in the field of beamforming. Common Reference Signals can not be beamformed for much the same reason they cannot have different powers at certain frequencies.

Figure 8:
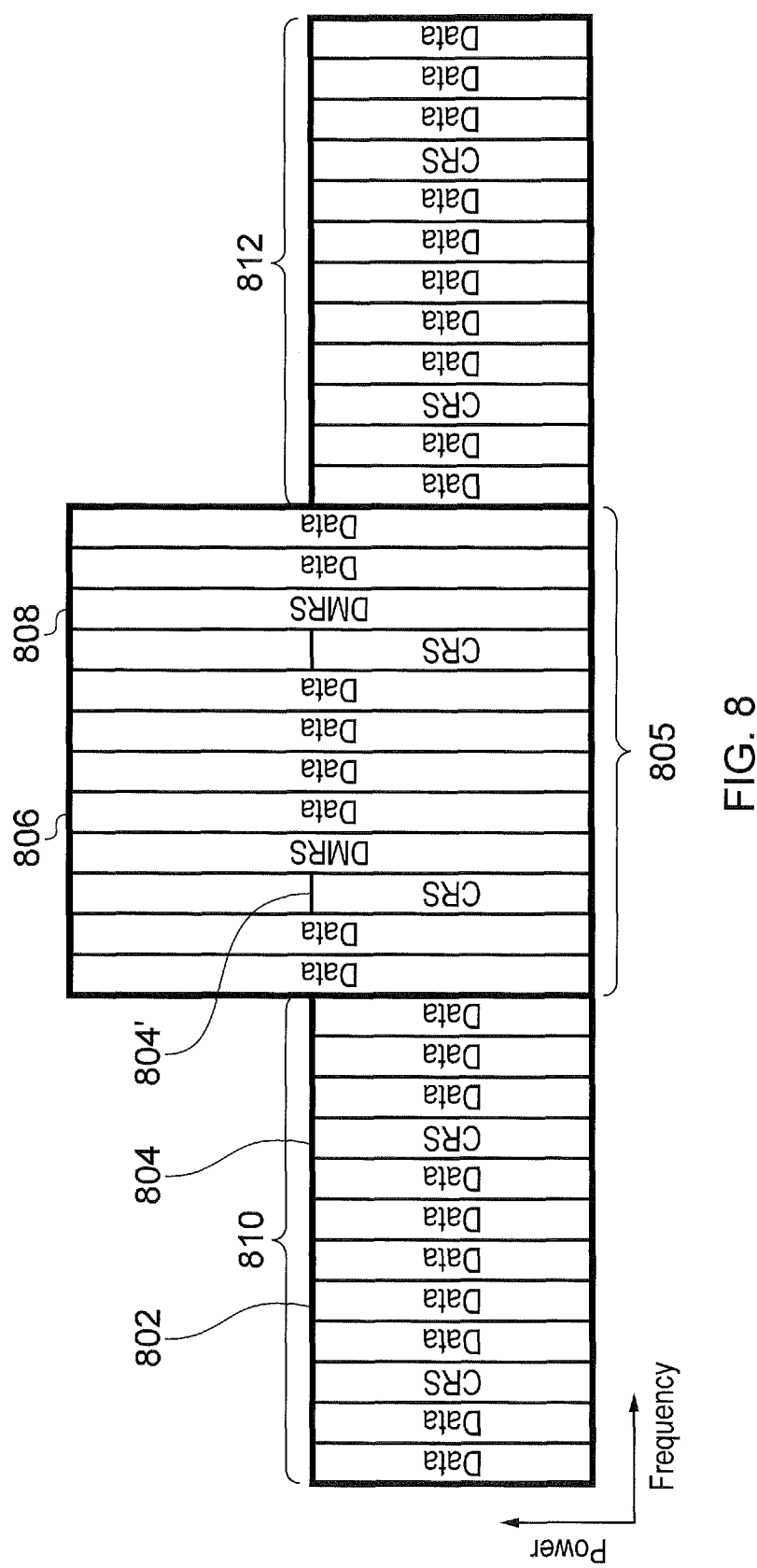
FIG. 8 schematically illustrates the relative transmission powers of a plurality of subcarriers including subcarriers providing a narrow band virtual carrier with power boosting of data symbols within the virtual carrier and the insertion of user specific reference symbols.

In beamforming, a known approach is to insert UE specific reference signals (illustrated as rectangles with the letters "DMRS"—Demodulation Reference Signal in FIG. 8). These specific reference signals can be power boosted along with the data signal. As these reference signals are used only by the UE that is receiving the power boosted data signal, their presence will not affect other UEs in the cell.

FIG. 8 schematically illustrates the relative transmission powers of a plurality of subcarriers including subcarriers providing a narrow band virtual carrier 805 with power boosting of data symbols 806 within the virtual carrier and the insertion of user specific reference symbols 808. As for FIGS. 7A and 7B, FIG. 8 illustrates a section through a subframe at a given time and shows the transmission power as the vertical axis and frequency as the horizontal axis. Normal PDSCH regions 810,812 surround a narrow band virtual carrier 805, which again occupies only 12 subcarriers, 1RB. The data 802 and reference signal resource elements 804 in PDSCH regions 810,812 are all shown at the same transmission power, the data resource elements 806 in the virtual carrier region 805 are of higher transmission power that those of the PDSCH regions 810,812 while common reference signals 804' remain at the same transmission power as they do in the PDSCH regions 810,812. In place of selected data resource elements, the common reference signals 804' are augmented by specific reference signals 808. The specific reference signals are raised to the same (higher) transmission power as the data resource elements 806.

There is a cost to the insertion of specific reference symbols as they replace data resource elements. Furthermore, they provide no additional benefit to any UE other than the UEs for which a power-boosted reference signal is required.

Finally, it has been realised that (non-boosted) common reference signals are adequate for channel estimation purposes alongside transmission power boosted data resource elements up to a certain threshold power level. Below this threshold level, data can be transmitted at higher power (for increased coverage) without the insertion of specific reference signals being needed for channel estimation.

This threshold power level differs depending upon the precise modulation and coding scheme (MCS) applied to the transmitted resource elements. The MCS has a bearing on the tolerance of error in channel estimation. Thus an MCS such as QPSK leads to a channel estimation process that is more tolerant of error that 64QAM or 16QAM, say. Table 1 below illustrates the differences in the threshold power levels for selected MCS reflecting the different degrees of error tolerance in channel estimation using the respective MCS.

TABLE 1

|  | QPSK | 16QAM | 64QAM |
|---|---|---|---|
| Power Boost Threshold [dB] | 9 | 6 | 3 |

Consequently, it is beneficial to determine whether insertion of specific reference signals is likely to be of significant advantage. This determination is made depending on the level of the power boosting required and type of modulation used for the data signals.

Figure 9:
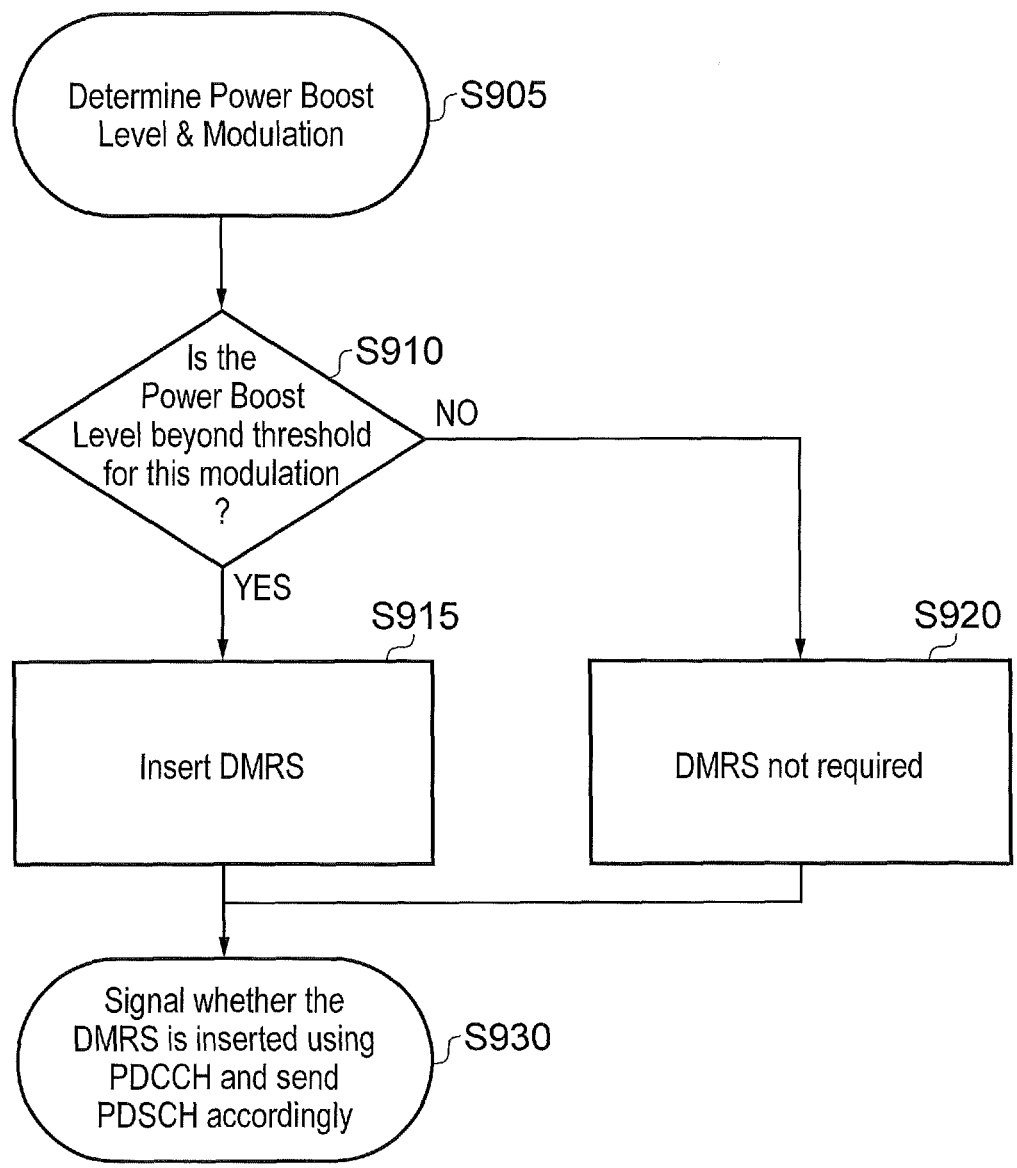
FIG. 9 shows schematically the operation of infrastructure equipment in determining whether to insert user specific reference symbols.

FIG. 9 shows an example of the operation of infrastructure equipment in determining whether to insert user specific reference symbols.

In cases where the required level of power boosting is low (i.e. the UE is nearby and the transmission power of the common reference signals and data resource elements are sufficiently close) and when the modulation used for data is more tolerant towards channel estimation errors, the eNB may choose not to insert specific reference symbols. By contrast, in cases where the required level of power boost is high and when modulation used for data is less tolerant towards channel estimation errors, the infrastructure equipment (e.g. an eNB) should insert specific reference signals to exploit fully the gains of power boosting.

The presence of specific reference symbols (DMRS) needs to be signalled to the UE for which the power boost is required, so that the UE knows which reference signals are available for use in demodulating the data signal. Signalling of the level of power boost may be achieved in PDCCH signalling.

The infrastructure equipment firstly determines the level of power boost required for transmissions to the UE. In addition, the modulation and coding scheme for the data is determined (step S905).

A table such as Table 1 is consulted to extract a threshold power level value that corresponds to the MCS determined in step S905. Next, it is determined whether the required level of power boost exceeds the threshold power level for the determined MCS (step S910).

Where the power level does exceed the respective threshold value, the infrastructure equipment inserts specific reference signals at higher transmission power (S915): this higher transmission power may conveniently be substantially the same power as the power boosted data resource elements.

Where the power level does not exceed the respective threshold value, the infrastructure equipment transmits only data resource elements at the boosted transmission power (S920).

Finally, in this example, the infrastructure equipment signals the fact that specific reference signals have been inserted (S930). The same signalling conveniently indicates where in the sub-frame grid they are inserted and/or what their transmission power level is. The boosted data channel PDSCH is then transmitted alongside (boosted specific reference signals) and non-boosted common reference signals.

The reader will readily appreciate that in an alternative arrangement, the infrastructure equipment may elect to insert specific reference signals regardless of any perceived benefit at modest power boost levels.

The guaranteed presence of specific reference signals in addition to common reference signals leads to a further consideration: if the reference signals (of either type) are reliable, the UE should in principle be able to conduct a more accurate channel estimation by virtue of the presence of additional reference points (compared to common reference signals alone). However, if some of the reference points are too weak, then combining these unreliable reference points may degrade the total channel estimation accuracy to a level below what can be achieved using the specific reference signals alone.

Figure 10:
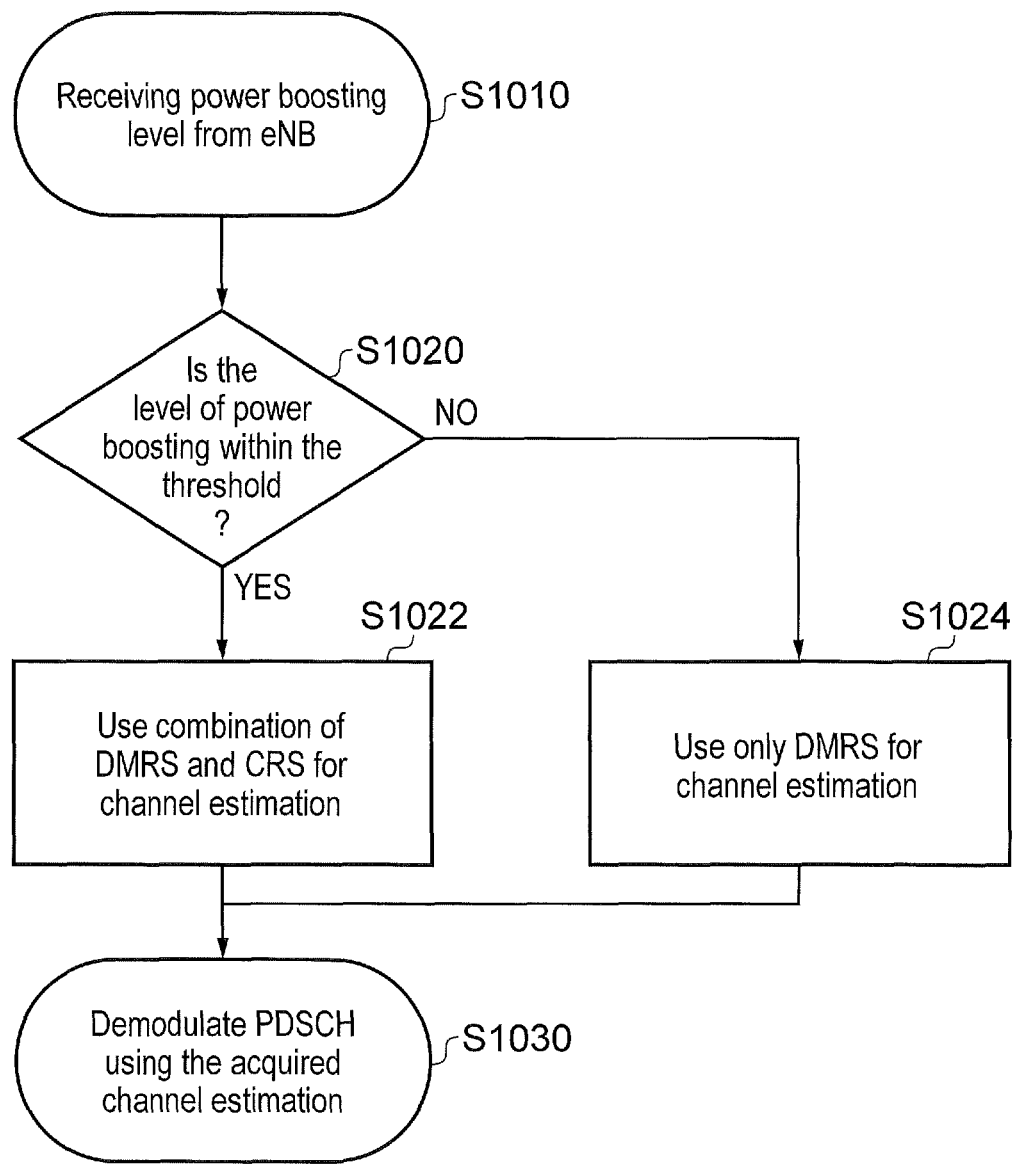
FIG. 10 shows schematically the operation of user equipment, there being user specific reference symbols in addition to common reference symbols, in determining whether to use only the user specific reference symbols or a combination of common and user specific reference symbols to generate channel estimates.

In FIG. 10, a method is illustrated whereby a user equipment (UE) decides whether to use specific reference signals alone or a combination of specific reference signals and common reference signals to conduct channel estimation, depending on the power boosting level.

FIG. 10 shows schematically the operation of the UE in determining whether to use only the user specific reference symbols or a combination of common and user specific reference symbols to generate channel estimates.

Here, the UE receives signalling from the infrastructure equipment indicating the level of power boosting in data resource element transmissions (step S1010).

The UE then compares the level of power boosting to a predetermined threshold value (step S1020). Where the level of power boosting lies below (or on) the predetermined threshold value, it is assumed that the common reference signals (CRS) represent suitably reliable reference points and the channel estimation process uses both common and specific reference signals in the generation of channel estimates (step S1022).

Where the level of power boosting exceeds the predetermined threshold value, it is assumed that the common reference signals (CRS) are unreliable as reference points and the channel estimation process discards common reference signals, using specific reference signals alone in the generation of channel estimates (step 1024).

Finally, whether common reference signals are used or discarded, the resulting channel estimates are used by the UE in demodulating the received data symbols (PDSCH)—step 1030.

In alternative implementations, the UE may determine the power boosting level independently by measuring the power levels of the received common reference signals and specific reference signals. Thus step S1010, may be replaced by an alternative step of determining the level of power boosting by determining the relative difference between the received power levels and extrapolating from knowledge of the common reference signal transmission power.

In further alternative implementations, the relative contribution of common reference signals and specific reference signals is not determined in a binary manner. Instead the respective reference signals are weighed differently to one another when calculating the channel estimation, the weights applied depending on the relative power levels.

The skilled reader will appreciate that while much of the preceding discussion is cast in terms of power boosting the various embodiments of the invention apply equally to situations where transmission power is continuously adjusted to ensure constant receive power levels at the receiving UE. Power boosting strictly speaking refers to the instantaneous increase of transmission power to transmit signal (typically in an attempt to send data to "hard to reach" UEs; the continuous adjustment of transmission power may be considered a form of power control.

The following numbered clauses provide further example aspects and features of the present technique:

1. A method for communicating with a communications device from an infrastructure equipment forming part of a wireless communications network, the method comprising:
transmitting data to communications devices via a wireless access interface, the wireless access interface providing a plurality of communications resource elements across a system bandwidth, which are divided in time into a plurality of time divided radio frames,
providing, within the system bandwidth, a first section of communications resource elements within a first frequency bandwidth for allocation preferably to reduced capability communications devices to receive signals representing the data transmitted by the infrastructure equipment within the first frequency bandwidth forming a virtual carrier, the reduced capability communications devices each having a receiver bandwidth which is greater than or equal to the first frequency bandwidth but less than the system bandwidth,
wherein transmitting data to the communications resources includes
transmitting data symbols on a first subset of the resource elements in one or more of the radio frames, and
transmitting common reference symbols on a second subset of the resource elements in each radio frame at a first transmission power; and
wherein the data symbols in said virtual carrier are transmitted on the first subset of resource elements at a second transmission power; and the method further comprises
determining a difference in transmission power between the second transmission power and the first transmission power, and
if the difference in transmission power substantially exceeds a set threshold, generating specific reference symbols and inserting said specific reference symbols within the virtual carrier in place of one or more of the data symbols, said specific reference symbols having a third transmission power, the third transmission power being greater than the first transmission power.

2. A method according to clause 1, wherein data symbols outside said first section are transmitted at the first transmission power.

3. A method according to clause 1 or 2, wherein data symbols in said first section are modulated using a given modulation and coding scheme and wherein the set threshold is set in accordance with the given modulation and coding scheme.

4. A method according to clause 3, wherein the set threshold is set in accordance with the error tolerance of at least one of a modulation scheme and a coding scheme used to transmit the data symbols, whereby a receiver can recover the data symbols by demodulating and decoding the data symbols in accordance with said at least one of the modulation scheme and the coding scheme and an estimate of a channel through which the data symbols have passed using the reference signals.

5. A method according to any preceding clause, wherein the difference in transmission power results from an instantaneous increase of transmission power within the first section, the transmission power being thereby boosted for specific communications devices.

6. A method according to any preceding clause, comprising transmitting to the at least one of the communications devices a signal indicating the specific reference symbols.

7. A method according to clause 6, comprising transmitting control symbols via a third subset of the resource elements in each radio frame and transmitting signals indicating the specific reference symbols to the at least one communication device in at least one of said control symbols.

8. A method according to any preceding clause, wherein the third transmission power is substantially equal to the second transmission power.

9. Infrastructure equipment for communicating with a communications device, said equipment forming part of a wireless communications network and comprising:
a transmitter unit configured to transmit data to communications devices via a wireless access interface, the wireless access interface providing a plurality of communications resource elements across a system bandwidth, which are divided in time to form a plurality of time divided radio frames, and
a controller configured to control the transmitter unit to provide, within the system bandwidth, a first section of communications resource elements within a first frequency bandwidth for allocation preferably to reduced capability communications devices to receive signals representing the data transmitted by the transmitter unit within the first frequency bandwidth forming a virtual carrier, the reduced capability communications devices each having a receiver bandwidth which is greater than or equal to the first frequency bandwidth but less than the system bandwidth, wherein the controller in combination with the transmitter are configured to transmit data symbols using a first subset of the resource elements in one or more of the radio frames, and to transmit common reference symbols via a second subset of the resource elements in each radio frame at a first transmission power;

wherein the transmitter unit is configured to transmit the data symbols in said virtual carrier with a second transmission power; and the controller is configured to determine a difference in transmission power between the second transmission power and the first transmission power, and, if the difference in transmission power substantially exceeds a set threshold, to generate specific reference symbols and to insert said specific reference symbols within the virtual carrier in place of data symbols, said specific reference symbols having a third transmission power, the third transmission power being greater than the first transmission power.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6

The invention claimed is:

1. A method for communicating with a communications device from an infrastructure equipment forming part of a wireless communications network, the method comprising:

transmitting data to communications devices via a wireless access interface, the wireless access interface providing a plurality of communications resource elements across a system bandwidth, which are divided in time into a plurality of time divided radio frames, providing, within the system bandwidth, a first section of communications resource elements within a first frequency bandwidth for allocation preferably to reduced capability communications devices to receive signals representing the data transmitted by the infrastructure equipment within the first frequency bandwidth forming a virtual carrier, the reduced capability communications devices each having a receiver bandwidth which is greater than or equal to the first frequency bandwidth but less than the system bandwidth, wherein transmitting data to the communications resources includes transmitting data symbols on a first subset of the resource elements in one or more of the radio frames, and transmitting common reference symbols on a second subset of the resource elements in each radio frame at a first transmission power; and wherein the data symbols in said virtual carrier are transmitted on the first subset of resource elements at a second transmission power; and the method further comprises determining a difference in transmission power between the second transmission power and the first transmission power, and if the difference in transmission power substantially exceeds a set threshold, generating specific reference symbols and inserting said specific reference symbols within the virtual carrier in place of one or more of the data symbols, said specific reference symbols having a third transmission power, the third transmission power being greater than the first transmission power.

2. The method as claimed in claim 1, wherein data symbols outside said first section are transmitted at the first transmission power.

3. The method as claimed in claim 1, wherein data symbols in said first section are modulated using a given modulation and coding scheme and wherein the set threshold is set in accordance with the given modulation and coding scheme.

4. The method as claimed in claim 3, wherein the set threshold is set in accordance with the error tolerance of at least one of a modulation scheme and a coding scheme used to transmit the data symbols, whereby a receiver can recover the data symbols by demodulating and decoding the data symbols in accordance with said at least one of the modulation scheme and the coding scheme and an estimate of a channel through which the data symbols have passed using the reference signals.

5. The method as claimed in claim 1, wherein the difference in transmission power results from an instantaneous increase of transmission power within the first section, the transmission power being thereby boosted for specific communications devices.

6. The method as claimed in claim 1, comprising transmitting to the at least one of the communications devices a signal indicating the specific reference symbols.

7. The method as claimed in claim 6, comprising transmitting control symbols via a third subset of the resource elements in each radio frame and transmitting signals indicating the specific reference symbols to the at least one communication device in at least one of said control symbols.

8. The method as claimed in claim 1, wherein the third transmission power is substantially equal to the second transmission power.

9. Infrastructure equipment for communicating with a communications device, said equipment forming part of a wireless communications network and comprising:

a transmitter configured to transmit data to communications devices via a wireless access interface, the wireless access interface providing a plurality of communications resource elements across a system bandwidth, which are divided in time to form a plurality of time divided radio frames, and circuitry configured to control the transmitter to provide, within the system bandwidth, a first section of communications resource elements within a first frequency bandwidth for allocation preferably to reduced capability communications devices to receive signals representing the data transmitted by the transmitter within the first frequency bandwidth forming a virtual carrier, the reduced capability communications devices each having a receiver bandwidth which is greater than or equal to the first frequency bandwidth but less than the system bandwidth, wherein the circuitry in combination with the transmitter are configured to transmit data symbols using a first subset of the resource elements in one or more of the radio frames, and to transmit common reference symbols via a second subset of the resource elements in each radio frame at a first transmission power;

wherein the transmitter is configured to transmit the data symbols in said virtual carrier with a second transmission power; and the circuitry is configured to determine a difference in transmission power between the second transmission power and the first transmission power, and, if the difference in transmission power substantially exceeds a set threshold, to generate specific reference symbols and to insert said specific reference symbols within the virtual carrier in place of data symbols, said specific reference symbols having a third transmission power, the third transmission power being greater than the first transmission power.

10. The infrastructure equipment as claimed in claim 9, wherein data symbols outside said first section are transmitted at the first transmission power.

11. The infrastructure equipment as claimed in claim 9, wherein data symbols in said first section are modulated using a given modulation and coding scheme and wherein the set threshold is set in accordance with the given modulation and coding scheme.

12. The infrastructure equipment as claimed in claim 11, wherein the set threshold is set in accordance with the error tolerance of at least one of a modulation scheme and a coding scheme used to transmit the data symbols, whereby a receiver can recover the data symbols by demodulating and decoding the data symbols in accordance with said at least one of the modulation scheme and the coding scheme and an estimate of a channel through which the data symbols have passed using the reference signals.

13. The infrastructure equipment as claimed in claim 9, wherein the difference in transmission power results from an instantaneous increase of transmission power within the first section, the transmission power being thereby boosted for specific communications devices.

14. The infrastructure equipment as claimed in claim 9, wherein the transmitter is configured to transmit to the at least one of the communications devices a signal indicating the specific reference symbols.

15. The infrastructure equipment as claimed in claim 14, wherein the transmitter is configured to transmit control symbols via a third subset of the resource elements in each radio frame and transmitting signals indicating the specific reference symbols to the at least one communication device in at least one of said control symbols.

16. The infrastructure equipment as claimed in claim 9, wherein the third transmission power is substantially equal to the second transmission power.

* * * * *